United States Patent Office 3,235,554
Patented Feb. 15, 1966

3,235,554
7-AMINO-1-METHYL-2,4-DIOXO-1,2,3,4,5,6-HEXA-HYDROPYRIDO[2,3-d]-PYRIMIDINE AND RELATED COMPOUNDS
Viktor Papesch, Morton Grove, Ill., assignor to G. D. Searle & Co., Chicago, Ill., a corporation of Delaware
No Drawing. Filed Nov. 12, 1963, Ser. No. 323,064
7 Claims. (Cl. 260—256.4)

The present invention relates to a group of amino-substituted bicyclic heterocyclic compounds. More particularly, it relates to compounds having the following general formula

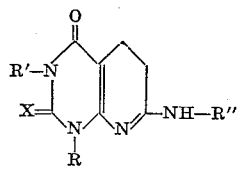

wherein R is lower alkyl, lower alkenyl, benzyl, or phenyl; R' is selected from the group consisting of hydrogen and lower alkyl; R" is selected from the group consisting of hydrogen and lower alkanoyl; X is selected from the group consisting of O and S.

The lower alkyl radicals referred to above contain up to 6 carbon atoms and are exemplified by radicals such as methyl, ethyl, propyl, butyl, pentyl, and hexyl. The lower alkenyl radicals referred to above likewise contain up to 6 carbon atoms and are exemplified by radicals such as allyl and methallyl. Furthermore, the benzyl and the phenyl groups referred to above can be further substituted on the aromatic ring with substituents such as methyl, chloro, and methoxy. The lower alkanoyl groups referred to above contain up to 6 carbon atoms and are exemplified by acetyl and propionyl.

The compounds of this invention are useful because of their pharmacological properties. In particular, the present compounds are useful anti-ulcer agents. This is particularly demonstrated by their inhibition of ulceration in the Shay rat. They also possess anti-inflammatory activity which is demonstrated by a phenylbutazone-like effect on edematous conditions. The present compounds also show activity as centeral nervous system depressants.

The compounds of the present invention are prepared from the appropriately substituted 6-aminouracil and acrylonitrile. The reaction is generally carried out at reflux in a solvent mixture consisting of water and an organic base such as pyridine. A quaternary ammonium base can additionally be present in the reaction mixture to serve as a catalyst. One base particularly useful as a catalyst is trimethylbenzylammonium hydroxide. This base promotes both the cyanoethylation reaction and the cyclization reaction described below.

The reaction betwen acrylonitrile and 6-aminouracils to give the present compounds apparently proceeds by a two step procedure. Thus, the acrylonitrile adds to the 5-position of the uracil to give a compound of the following type

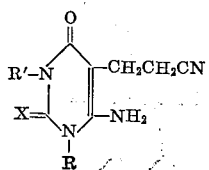

wherein the symbols R, R', X have the same significance as above. This 5-cyanoethyluracil then cyclizes to give the compounds of the present invention. Evidence for the above comes from the fact that, although the compounds of the present invention can be obtained from the direct reaction of acrylonitrile with the appropriate aminouracil, it is also possible to isolate the correspondingly substituted 5-cyanoethyluracil from the same reaction mixture. Such a 5-cyanoethyluracil can then be cyclized to give the corresponding 7-amino-1,2,3,4,5,6-hexahydropyrido[2,3-d]pyrimidine of the present invention. Thus, the 5-cyanoethyluracils referred to above must also be considered as novel compounds which are useful for the preparation of the compounds of the present invention.

The compounds which constitute this invention and their preparation will appear more fully from a consideration of the following examples which are given for the purpose of illustration only and are not to be construed as limiting the invention in spirit or in scope. In these examples, quantities are indicated in parts by weight unless parts by volume are indicated, and temperatures are given in degrees centigradte (° C.). The relationship between parts by weight and parts by volume is the same as that existing between grams and milliliters.

Example 1

A mixture of 20 parts of 6-amino-1-methyluracil, 32 parts of acrylonitrile, 1500 parts by volume of a 50% by volume pyridine-water mixture, and 10 parts by volume of a 40% aqueous solution of trimethylbenzylammonium hydroxide is refluxed for 3.5 hours. The mixture is then distilled under reduced pressure on a steam bath to remove low boiling materials. The residue is mixed with 100 parts of water and filtered and the filtered solid is further washed with water. The solid is then extracted with 1400 parts of boiling water and filtered and the residual solid is recrystallized from dimethylformamide. The product thus obtained, an organic solid which does not melt below 350° C., is 7-amino-1-methyl-2,4-dioxo-1,2,3,4,5,6-hexahydropyrido[2,3-d]pyrimidine and it has the following formula

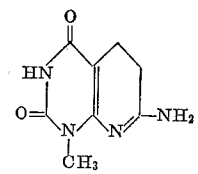

Example 2

A solution of 80 parts of 6-amino-1-ethyluracil, 64 parts of acrylonitrile, and 400 parts by volume of a 50% by volume pyridine-water mixture is refluxed for 2 hours. Low boiling material is then evaporated from the mixture on a steam bath and the residue is boiled with 300 parts of water and filtered while hot. The insoluble solid is then recrystallized from 400 parts of dimethylformamide to give 7-amino-1-ethyl-2,4-dioxo-1,2,3,4,5,6-hexahydropyrido[2,3-d]pyrimidine as a solid which does not melt below 350° C. This compound has the following formula

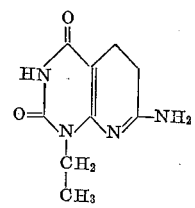

Example 3

A mixture of 1.35 parts of 7-amino-1-ethyl-2,4-dioxo-1,2,3,4,5,6-hexahydropyrido[2,3-d]pyrimidine and excess acetic anhydride is refluxed for 7 minutes. The reaction mixture is then cooled and the solid which forms is separated by filtration and washed repeatedly with absolute ethanol. This gives 7-acetamido-1-ethyl-2,4-dioxo-1,2,3,4,5,6-hexahydropyrido[2,3-d]pyrimidine melting at about 294–296° C. This compound has the following formula

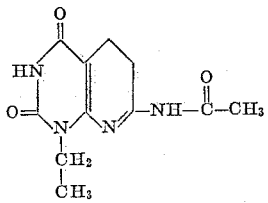

Example 4

80 parts of 6-amino-1-propyluracil, 400 parts by volume of 50% by volume pyridine-water, and 65 parts of acrylonitrile are mixed and then refluxed for 3 hours. An additional 65 parts of acrylonitrile is then added and refluxing is resumed for an additional 3 hours. The resultant mixture is then filtered and low boiling material is removed from the filtrate by heating on a stream bath under reduced pressure. 40 parts of water is added to the residue and the mixture is evaporated to dryness again. The resultant residue is then treated with 200 parts of boiling methanol and the suspension which results is filtered while hot. The filtered solid is washed with hot methanol and ether and then recrystallized twice from 50% ethanol to give 6-amino-5-(2-cyanoethyl)-1-propyluracil melting at about 250–252° C.

A mixture of 3 parts of 6-amino-5-(2-cyanoethyl)-1-propyluracil, 55 parts of absolute ethanol and 10 parts by volume of a 40% aqueous solution of trimethylbenzylammonium hydroxide is refluxed for 6 minutes. The resultant solution is neutralized with concentrated hydrochloric acid and cooled. The precipitate which forms is separated and recrystallized from 60% ethyl alcohol to give 7-amino-1-propyl-2,4-dioxo-1,2,3,4,5,6-hexahydropyrido[2,3-d]pyrimidine melting at about 298–302° C.

Example 5

To a solution of 116 parts of 6-amino-1-allyluracil and 1300 parts by volume of a 50% by volume pyridine-water mixture, there is added 185 parts of acrylonitrile and the resultant mixture is refluxed for 2 hours. Then, 95 parts of acrylonitrile is added and the mixture is refluxed for 2 hours. The addition of acrylonitrile followed by refluxing is then repeated twice and the mixture is refluxed for 3 hours after the addition of the final portion of acrylonitrile. Low boiling materials are then removed from the reaction mixture by heating it on a steam bath under reduced pressure. The residue is a syrup which is mixed with 500 parts of boiling water and filtered while hot. The filtered precipitate is pulverized and then extracted with 50 parts of boiling water 3 times. The residual material is 7-amino-1-allyl-2,4-dioxo-1,2,3,4,5,6-hexahydropyrido[2,3-d]pyrimidine melting at about 305° C.

The aqueous filtrate obtained from the water treatment of the original crude product above is evaporated to dryness under reduced pressure and on a steam bath. The residue is a glassy material which is boiled with 1100 parts of ethyl acetate to give a suspension which is then filtered. The resultant filtrate is diluted with 1050 parts of benzene and filtered. The resultant filtrate is chromatographed on a silica gel column. The column is eluted with increasing amounts of ethyl acetate in benzene. The solvent is evaporated from the later fractions which are eluted by means of 70% ethyl acetate in benzene to give a residual solid which is recrystallized from methanol. The product thus obtained is 6-amino-5-(2-cyanoethyl)-1-allyluracil.

Example 6

A mixture of 21 parts of 6-amino-1,3-diethyl-uracil, 70 parts by volume of a 50% by volume pyridine-water mixture, 17 parts of acrylonitrile, and 5 parts by volume of a 40% aqueous solution of trimethylbenzylammonium hydroxide is refluxed for 2.5 hours. The resultant mixture is cooled and filtered and the solid which is thus separated is then recrystallized from methanol to give 7-amino-1,3-diethyl-2,4-dioxo-1,2,3,4,5,6-hexahydropyrido[2,3-d]pyrimidine melting at about 279–280° C. This compound has the following formula

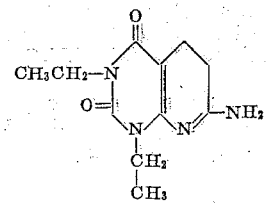

The filtrate obtained from the original reaction mixture above is heated on a steam bath to remove low boiling materials and leave a residual syrup. This is dissolved in a 10% solution of methanol in ethyl acetate and the resultant solution is chromatographed on a silica gel column. The column is eluted with increasing amounts of methanol in ethyl acetate and the solvent is evaporated from the eluate obtained by elution with 10% methanol in ethyl acetate and the readily soluble portion of the residue is recrystallized from ethyl acetate to give 6-amino-5-(2-cyanoethyl)-1,3-diethyluracil melting at about 147° C.

Example 7

A mixture of 40 parts of 6-amino-1-ethyl-3-methyluracil, 150 parts by volume of a 40% aqueous solution of trimethylbenzylammonium hydroxide, and 32 parts of acrylonitrile is refluxed for 4 hours. The resultant mixture is cooled and filtered and the filtered solid is recrystallized from methanol to give 7-amino-1-ethyl-3-methyl-2,4-dioxo-1,2,3,4,5,6-hexahydropyrido[2,3-d]pyrimidine.

Example 8

20 parts of 6-amino-1,3-dimethyl-2-thiouracil is dissolved in 150 parts by volume of a 50% by volume pyridine-water mixture and there is added to this solution 32 parts of acrylonitrile and then 5 parts by volume of a 40% aqueous solution of trimethylbenzylammonium hydroxide. A heavy precipitate forms in a few minutes. The mixture is stirred and refluxed for 2.5 hours, 16 parts of acrylonitrile is then added to the mixture, and stirring and refluxing is resumed for an additional 3 hours. The reaction mixture is then cooled and filtered and the filtered solid is washed with water. The solid is then dried and recrystallized from dimethylformamide to give 7-amino-1,3-dimethyl-4-oxo-2-thio-1,2,3,4,5,6-hexahydropyrido[2,3-d]pyrimidine melting at about 334–336° C. This compound has the following formula

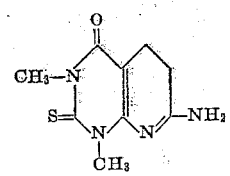

What is claimed is:
1. A compound of the formula

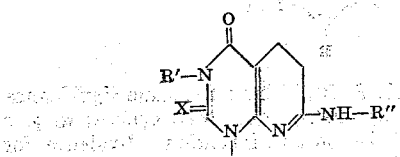

wherein R is selected from the group consisting of lower alkyl and lower alkenyl; R' is selected from the group consisting of hydrogen and lower alkyl; R" is selected from the group consisting of hydrogen and acetyl; and X is selected from the group consisting of O and S.

2. A compound of the formula

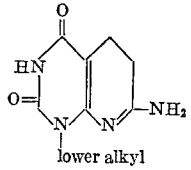

3. 7-amino-1-methyl-2,4-dioxo-1,2,3,4,5,6-hexahydropyrido[2,3-d]pyrimidine.

4. 7-amino-1-ethyl-2,4-dioxo-1,2,3,4,5,6-hexahydropyrido[2,3-d]pyrimidine.

5. A compound of the formula

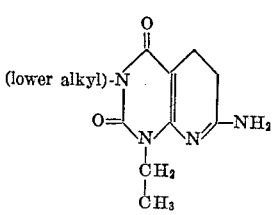

6. 7-amino-1-ethyl-3-methyl-2,4-dioxo-1,2,3,4,5,6-hexahydropyrido[2,3-d]pyrimidine.

7. 7-amino-1,3-diethyl-2,4-dioxo-1,2,3,4,5,6-hexahydropyrido[2,3-d]pyrimidine.

No references cited.

NICHOLAS S. RIZZO, *Primary Examiner.*